Feb. 4, 1969  E. LEHOCZKY  3,425,099
ADJUSTABLE CLAMP FOR COILING HOSE
Filed Dec. 4, 1967
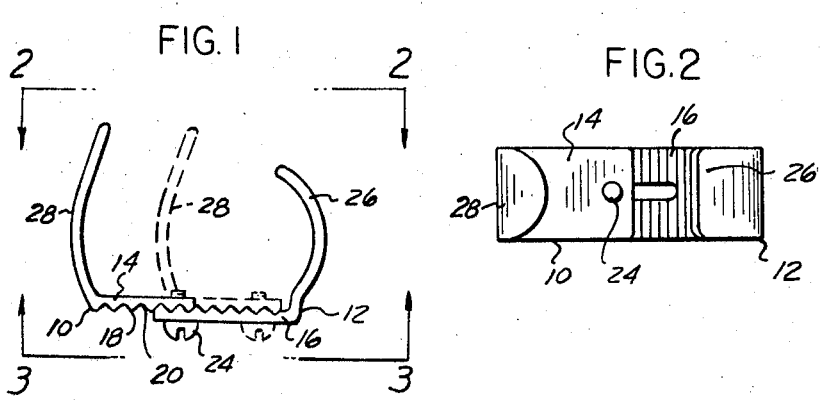
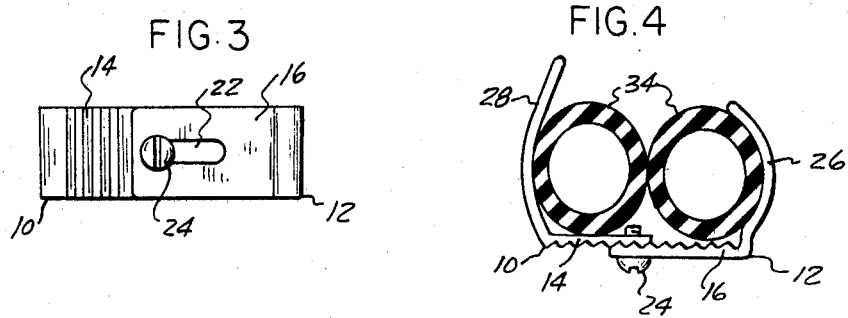
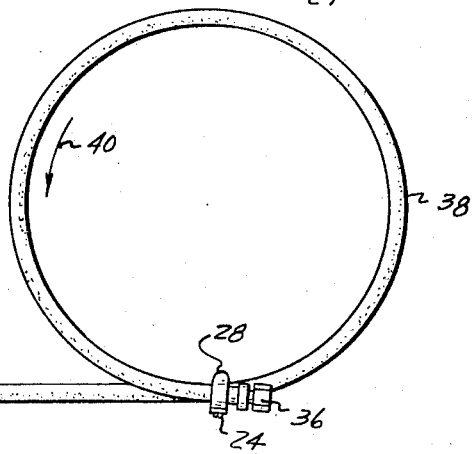
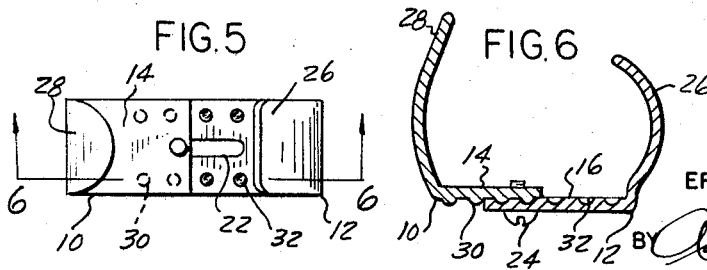
INVENTOR
ERNEST LEHOCZKY
BY Adolph G. Martin
ATTORNEY United States Patent Office 3,425,099
Patented Feb. 4, 1969

3,425,099
ADJUSTABLE CLAMP FOR COILING HOSE
Ernest Lehoczky, 9350 Manor,
Allen Park, Mich. 48101
Filed Dec. 4, 1967, Ser. No. 687,533
U.S. Cl. 24—81                    1 Claim
Int. Cl. A24b 21/00

ABSTRACT OF THE DISCLOSURE

An adjustable clamp for attachment to hose, cable and other similar elongated flexible members to facilitate the coiling of such members into uniform loops of any preselected size.

*Background of the invention*

This invention relates generally to devices for use in coiling elongated flexible members for storage, and more particularly to a clamp for use with water hose to provide an end loop of convenient size so that the remaining section of hose may be rolled into a series of loops having substantially the same diameter. Most devices presently in use for rolling and storing hose are bulky and cumbersome, and require considerable time to use and operate; consequently, householders usually permit the water hose to remain uncoiled on the lawn thereby exposing it to physical abuse and damage.

*Summary of the invention*

This invention comprises a pair of clips 10 and 12 connected together by adjustable means providing for limited relative movement therebetween. Upstanding inwardly curved fingers 26 and 28 on the clips 12 and 10 respectively, holdably engage the water hose 34 when it is coiled therebetween so as to provide an end loop 38 of preselected diameter.

*Brief description of the drawing*

FIGURE 1 is a side elevation view of the applicant's clamp showing the transverse ribs 18 and grooves 20 in the lateral section 14 and 16 of the clips 10 and 12 respectively.

FIGURE 2 is a top plan view, taken substantially on plane 2—2 in FIGURE 1, showing the characteristic shape of the two upstanding and inwardly curved fingers 28 and 26 on the clips 10 and 12 respectively.

FIGURE 3 is a bottom view, taken substantially on plane 3—3 of FIGURE 1, showing the elongated slot 22 in the lower clip 12.

FIGURE 4 is an elevation view, similar to FIGURE 1, showing the clamp attached to a hose 34.

FIGURE 5 is a top plan view, similar to FIGURE 2, showing a modification of the applicant's invention.

FIGURE 6 is a section view, taken substantially on plane 6—6 in FIGURE 5, showing the raised detents 30 and dimples 32 in the lateral sections 14 and 16 of the clips 10 and 12 respectively.

FIGURE 7 is an elevation view showing the clamp attached to a section of hose 34 so as to provide a terminal coiled loop 38.

*Detailed description of the preferred embodiments construction*

For a more detailed description of the invention, reference is made to the drawing in which numerals 10 and 12 designate a pair of clips having lateral sections 14 and 16 respectively. Alternate ribs 18 and grooves 20 are provided on the lower side of the lateral section 14 and the upper side of lateral section 16. An elongated slot 22 in the lateral section 16 of the clip 12 has therethrough a screw 24 threadably engaged in the lateral section 14 of the other clip 10. An upstanding inwardly curved finger 26 is formed on the outer end of the lateral section 16 of the clip 12.

An upstanding inwardly disposed finger 28, on the lateral section 14, is provided with a larger radius of curvature than the opposed finger 26 on the clip 12. The modification of the applicant's invention disclosed in FIGURES 5 and 6 differs from the embodiment of FIGURES 1 through 4 only in that two rows of raised detents 30 and dimples 32 are provided respectively on the lateral sections 14 and 16 as substitutes for the transverse ribs 18 and grooves 20.

The preceding discussion completes a description of the structural details of the disclosed embodiments of the applicant's invention; however, to comprehend more fully the subject matter herein presented, a discussion is next directed to the manner in which the adjustable clamp is employed to fulfill its purpose and perform its intended function.

*Use and operation*

In practice, the applicant's clamp is first adjusted by loosening the screw 24 sufficiently to allow the ribs 18 to slide freely across the grooves 20. The proper separation between the upstanding curved fingers 26 and 28 is then provided so that they will holdably engage therebetween the hose 34 with which the clamp is to be used, as shown in FIGURE 4. The screw 24 is then tightened and the clamp attached to the hose 34 by holding the upstanding curved finger 26 in contact with the hose 34 adjacent the end fitting 36, and sliding the hose 34 downward along the other upstanding finger 28 to the position shown in FIGURE 4.

In this way a terminal loop 38 of the desired diameter, as illustrated in FIGURE 7, can thereby be provided. The section of hose 34 may then be rolled in the direction of the arrow 40, shown in FIGURE 7, thereby providing a series of loops of uniform diameter, matching that of the terminal loop 38, so as to facilitate the convenient handling and storage of the hose 34 when it is not in use. Since the use and operation of the modification disclosed in FIGURES 5 and 6, is identical to that of the embodiment in FIGURES 1 through 4, no separate discussion of use will be directed to the modified structure.

Based upon the foregoing discussion, the applicant is of the opinion that his invention has fulfilled a long-felt need in the field of hose clamps, and that he has made a valuable and significant contribution to the related art. However, while the invention was described with reference to the structural details of a limited number of embodiments, the principles involved are susceptible of numerous other practical adaptations.

Therefore, I claim as new and desire to secure by Letters Patent:

1. An adjustable clamp for use in rolling elongated flexible members such as garden hose comprising a pair of generally J-shaped clips having a lateral section on each of the clips and an upstanding inwardly curved finger on each clip for holdably engaging end portions of a coil on the flexible member when it is coiled therebetween, adjustable means releasably connecting the two clips so that the lateral sections are in abutting sliding contact with each other, said fingers each having a different radius of curvature and being of different lengths, the shorter finger having a radius of curvature complementary to the radius of curvature of the flexible member and the longer finger having the greater radius of curvature and projecting above the flexible member toward the shorter finger so as to prevent inadvertent removal of the flexible member coiled portions from the clamp when it is in locked condition with the fingers adjusted to place the end portions of the coil in abutting relationship.

References Cited

UNITED STATES PATENTS

| | | | |
|---|---|---|---|
| 1,240,527 | 9/1917 | Allen | 24—263 |
| 2,011,521 | 8/1935 | Lorenz. | |
| 2,662,261 | 12/1953 | Mikoski. | |
| 3,364,535 | 1/1968 | Metcalf. | |

FOREIGN PATENTS 524,379  5/1931  Germany.

DONALD A. GRIFFIN, Primary Examiner.

U.S. Cl. X.R.

24—263